United States Patent [19]
Mifsud

[11] 3,866,709
[45] Feb. 18, 1975

[54] VIBRATORY SEISMIC ENERGY GENERATOR

[75] Inventor: Joseph F. Mifsud, Houston, Tex.

[73] Assignee: Exxon Production Research Company, Houston, Tex.

[22] Filed: Nov. 12, 1973

[21] Appl. No.: 415,266

[52] U.S. Cl. .................... 181/114, 181/121, 340/17
[51] Int. Cl. ............................................. G01v 1/04
[58] Field of Search ...... 181/.5 VM, .5 H, 114, 121; 340/17

[56] References Cited
UNITED STATES PATENTS

| | | | |
|---|---|---|---|
| 3,280,938 | 10/1966 | Tullos | 181/.5 H |
| 3,282,372 | 11/1966 | Brown et al. | 181/.5 |
| 3,363,720 | 1/1968 | Mifsud et al. | 181/.5 H |
| 3,550,719 | 12/1970 | Meister | 181/.5 VM |
| 3,578,102 | 5/1971 | Ross | 181/.5 H |

*Primary Examiner*—Maynard R. Wilbur
*Assistant Examiner*—T. M. Blum

[57] ABSTRACT

A vibratory source of seismic energy comprises a base plate for contacting the earth driven by a hydraulically actuated piston connected to the base plate by a connecting rod. The piston cylinder has connected thereto a reaction mass of sufficient weight to remain substantially motionless when the piston is driving the base plate. The cylinder is aligned on the base plate by a structure including an annular flange extending into an annular bearing in the base plate, and an air spring for normally suspending the moveable bearing above the bottom of the annular bearing. A plurality of approximately vertically extending posts are connected to the base plate by air springs at one end of the posts. The other ends of the posts are connected to a ball joint housing means. A vertically extending shaft having a ball at one end for extending into the ball joint housing is provided for the purpose of lifting the vibrator and for applying vertical forces to the plate for holding the plate against the ground during vibratory movement thereof.

5 Claims, 3 Drawing Figures

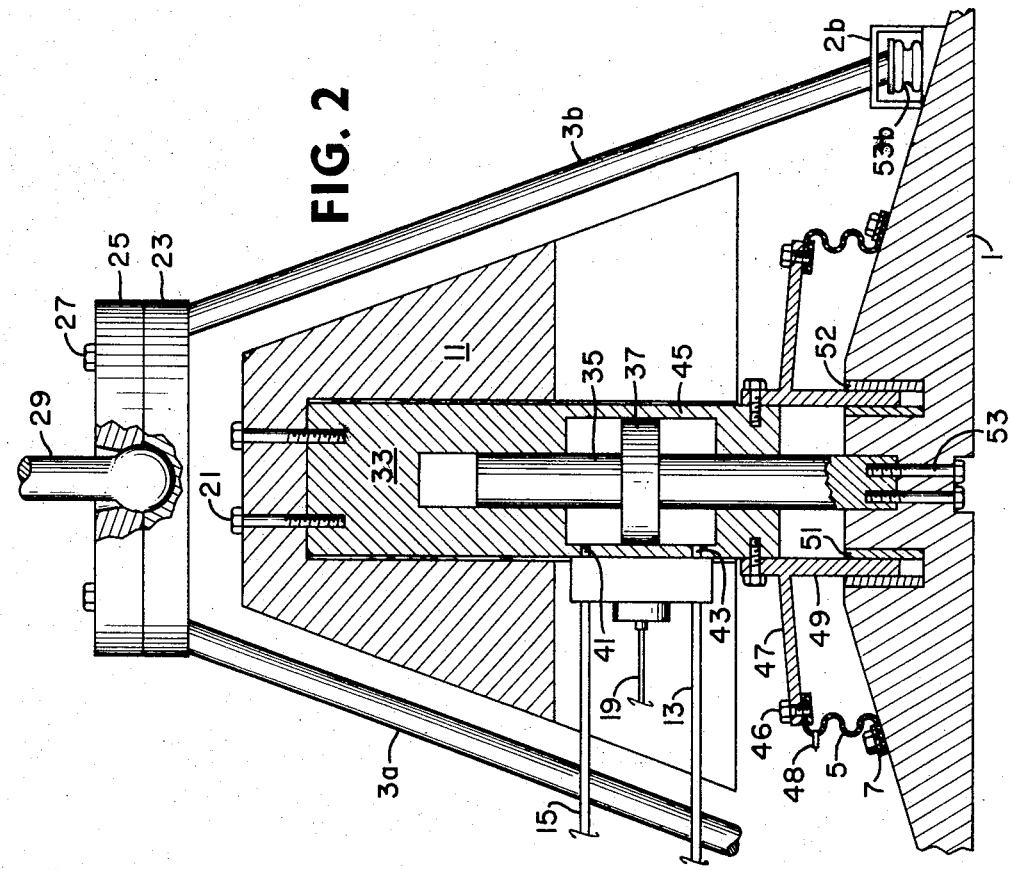
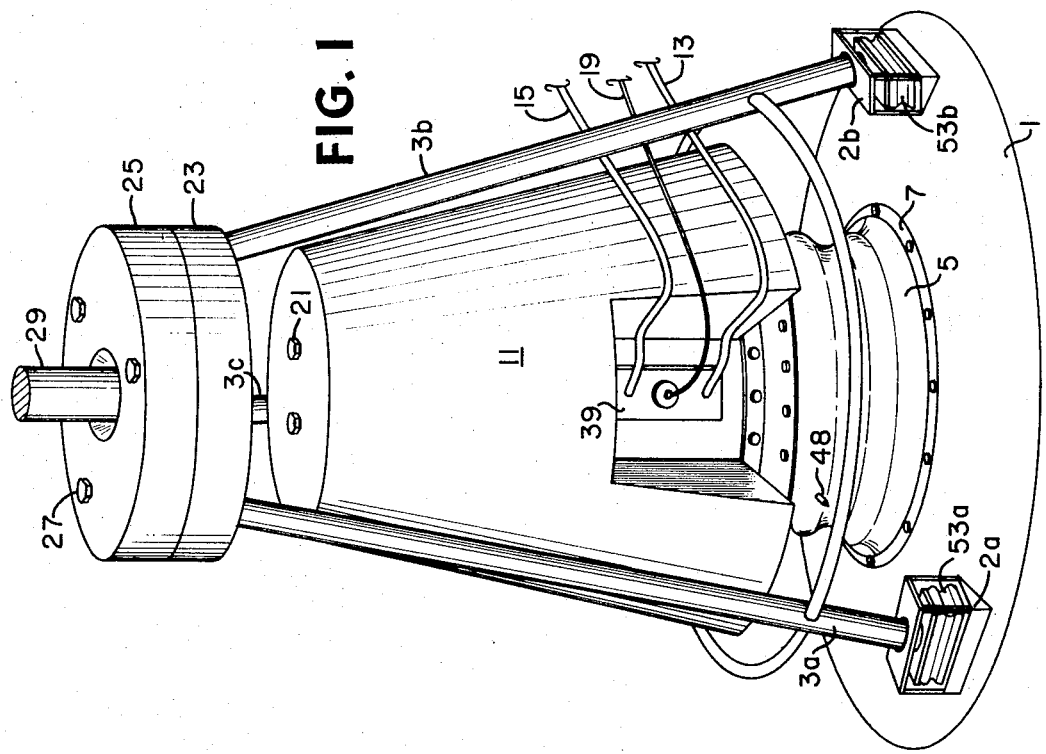

VIBRATORY SEISMIC ENERGY GENERATOR

BACKGROUND OF THE INVENTION

Vibratory sources of seismic energy used heretofore generally made use of a base plate driven by a hydraulically actuated piston connected to the base plate by a connecting rod. A reaction mass connected to the piston cylinder is designed to remain substantially motionless during vibration of the piston and plate. One problem encountered with such vibratory sources of seismic energy has been in connection with the bearings supporting the piston and connecting rod within the cylinder thereof and connecting the cylinder to the base plate. Such bearings often exhibit excessive wear and are difficult to maintain and service. In addition, the lifting mechanism for positioning and repositioning the vibrator on the earth's surface is usually fairly complex and does not distribute the hold-down weight of the truck or other heavy mass against the base plate so as to maintain the base plate in continuous contact with the earth. This is particularly true when the ground level is not substantially horizontal at the location where the vibrator is to be used. When the vibrator is being used on a slanting hillside, for example, problems arise associated with distribution of the hold-down weight on the base plate.

SUMMARY OF THE INVENTION

In accordance with the teachings of the present invention, an apparatus is provided for producing vibratory seismic energy in the earth utilizing an earth coupling plate and means for imparting vibratory motion to the plate which includes a power piston means, power cylinder means for the piston, and connecting rod means connecting the piston to the plate. Annular sleeve bearing means in the plate surrounds the rod means and an annular moveable bearing is connected to the cylinder means and extends into the bearing means. Elastic means of low compliance connected to said cylinder means supports the cylinder means on the plate. Also provided is a plurality of approximately vertically extending shaft means each connected at one end to the plate and at the other end to ball joint housing means. A vertically extending shaft means terminates in a ball for fitting into the ball joint housing means.

Objects and features of the invention not apparent from the foregoing discussion will become evident upon consideration of the following detailed description of the invention taken in connection with the accompanying drawings.

BRIEF DESCRIPTION OF THE DRAWINGS

In the drawings:

FIG. 1 is a perspective view of a seismic vibrator in accordance with the invention;

FIG. 2 is a sectional view taken along section 2—2 of FIG. 1; and

DETAILED DESCRIPTION OF AN EMBODIMENT OF THE INVENTION

Figure 3:
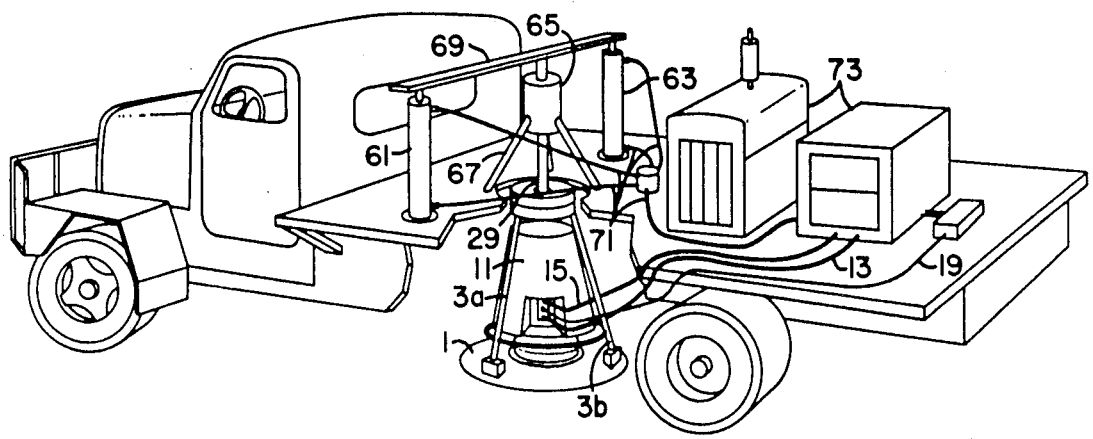
FIG. 3 is a view of the seismic vibrator mounted on a truck for transporting the vibrator from place to place.

Refer now to FIGS. 1 and 2 taken together. The seismic vibrator illustrated therein comprises a generally circular base plate 1 which is considerably thicker at its center than it is at its edges. The base plate is held against the ground by a heavy weight imposed thereon (as by a transporting vehicle or truck) which is transmitted through a substantially vertical shaft 29 having a ball at one end which is fitted into the members 23 and 25 of a ball joint housing. The two housing members 23 and 25 are connected together by a plurality of bolts 27. A plurality of approximately vertical posts 3a, 3b, and 3c are affixed at their upper ends to the ball joint housing and are connected at their lower ends to a plurality of air springs 53a, 53b, and 53c (the latter not shown) connected to the base plate by housing members 2a, 2b, and 2c.

As illustrated most perspicuously in FIG. 2, a power piston 37 is connected to the base plate 1 by means of a connecting rod or shaft 35 adapted for reciprocating movement in a power piston housing 45. The rod 35 is affixed at its lower end to the base plate 1 by means of a plurality of bolts 53 extending through the base plate into the rod 35. At its upper end, the rod 35 is supported by the housing member 45.

An electrohydraulic transducer 39 is provided for applying hydraulic pressure to one side or the other of the piston 37 in order to induce reciprocating movement thereof. The electrohydraulic transducer 39 is connected to the space within the cylinder 45 on opposite sides of the piston 37 through ports 41 and 43. High pressure hydraulic fluid is applied to the transducer from line 15. Line 13 provides drain of the hydraulic fluid from the transducer. The electrohydraulic transducer may be any of a number of devices well known to the art such as that illustrated in U.S. Pat. No. 3,363,720, J. F. Mifsud et al. Affixed to the upper end 33 of the power piston cylinder member 45 is a very heavy reaction mass 11 connected to said upper end 33 by means of a plurality of bolts 21. The mass should be sufficiently heavy so that it will remain substantially motionless during operation of the vibrator at the lowest frequency of interest. The mass has cutouts at the front and rear thereof in order to provide access to the electrohydraulic transducer 39 and to balance the mass.

Extending downwardly from the lower end of cylinder 45 is an annular bearing member 49 which is movable with the piston cylinder 45. Embedded in the base plate 1 is a fixed annular bearing member comprising an inner annular member 51 and an outer annular member 52 with a gap therebetween sufficient to accommodate the movable bearing member 49. An annular flange 47 extends outwardly from the movable bearing member 49, and near its outer edge is affixed to an air spring member 5 by bolts 46. A clamp 7 affixes the lower end of the air spring member 5 to the base plate 1. It is readily apparent that the annular sleeve bearing means 51 and 52 surround the rod means 35 and that the annular movable bearing means 49 extends into the gap between bearing means 51 and 52.

A Schroeder valve 48 is provided for introducing pressurized air into the closed space defined by the air spring, base plate 1, the flange 47, and the movable bearing member 49. Cylinder wall 49 may be perforated with a couple of holes to increase the volume of the air spring used to hold up the vibrator. Likewise, Schroeder valves (not shown) can be used to inflate each of the air springs members 53a, 53b, and 53c. The compliance of each of the air springs should be such that the resonant frequency of the springs and the mass of the truck is below the lowest operating frequency of the vibrator, the resonant frequency being defined by the following formula:

$$f_r = \tfrac{1}{2}\pi \sqrt{K/M}$$

where $K$ = total stiffness of springs 53a, 53b, and 53c, and $M$ = mass of truck With reference now to FIG. 3, the seismic vibrator is illustrated in its position on a vehicle such as a truck. The hydraulic lines 13 and 15 are shown connected to a source of hydraulic pressure 73. The lifting post 29 is illustrated as being vertically aligned by an annular sleeve bearing member 65 which is positioned above the floor of the truck by a tripod supporting arrangement including members 67. The upper end of the lifting shaft 29 is connected to a horizontal I beam 69, the ends of which are connected to a pair of hydraulic rams 61, 63 which may include fluids hydraulically actuated from the source of fluid pressure 73 through lines 71. When hydraulic pressure is applied to the bottom of lifting members 61, 63 the I beam 69 is raised along with the vibrator and its associated apparatus. At the top of air springs 53a, 53b, and 53c are metal flanges which bear against the top of housings 2a, 2b, and 2c attached to the base plate 1 and support the weight of the vibrator when the vibrator is raised off the ground and, when sufficient hydraulic pressure is applied to the top of members 61, 63, lift the truck so that most of its weight is supported by the shaft 29, the posts 3a, 3b, and 3c and the air springs associated therewith on the base plate 1.

Before the unit is placed in operation, the air springs 53a, 53b, and 53c are pressurized to a desired pressure to support the weight of the truck on the base plate. Furthermore, the closed space within the air spring 5, base plate 1, flange 47, and movable bearing member 49 is pressurized to lift the mass 11 and the piston cylinder 45 to a desired height above the base plate 1. When the electrohydraulic servovalve 39 is energized by an electrical signal on line 19, the piston 37 will be placed in up and down reciprocating motion which will be transmitted to the base plate 1. Because of the inertia of the member 11 rigidly bolted to cylinder 45, the bearing member 49 will remain substantially motionless, and the base plate will be free to vibrate in accordance with the electrical signal applied to leads 19. When the unit is positioned or repositioned on the ground, unevenness of the ground will be compensated for by the ball joint formed by the ball within the housing members 23 and 25. Thus, the vibratory base plate 1 can be canted to a considerable extent without adversely affecting the operation of the vibrator.

While the embodiment described above is preferred, other modifications will become evident to those skilled in the art which do not depart from the broadest aspects of the invention.

I claim:

1. Apparatus for producing vibratory seismic energy in the earth, comprising:
    an earth coupling plate;
    means for imparting vibratory motion to said plate including power piston means, power cylinder means for said piston, and connecting rod means connecting said piston to said plate;
    annular sleeve bearing means in said plate surrounding said rod means;
    annular movable bearing means around said rod means connected to said cylinder means and extending into said annular sleeve bearing means; and
    elastic means of low compliance connected to said plate and to said cylinder means or said movable bearing means for supporting said cylinder means on said plate.

2. The apparatus of claim 1 wherein said elastic means comprises air spring means.

3. The apparatus of claim 1 further including:
    a plurality of upwardly extending posts, each connected at one end to said plate;
    ball joint housing means connected to the other end of each of said upwardly extending posts;
    upwardly extending shaft means terminating in a ball at its lower end for fitting into said ball joint housing means; and
    annular bearing means surrounding said shaft means for positioning said shaft means.

4. The apparatus of claim 3 wherein said upwardly extending posts are connected to said plate by elastic means having low compliance to reduce vibration of said posts upon vibration of said plate.

5. The apparatus of claim 4 wherein said elastic means are air spring means.

* * * * *